United States Patent [19]
Hatanaka et al.

[11] Patent Number: 5,684,509
[45] Date of Patent: Nov. 4, 1997

[54] METHOD AND APPARATUS FOR PROCESSING IMAGE

[75] Inventors: Isamu Hatanaka; Masaaki Takimoto; Atsushi Saotome, all of Tokyo, Japan

[73] Assignee: Fuji Photo Film Co., Ltd., Kanagawa, Japan

[21] Appl. No.: 251,658

[22] Filed: May 31, 1994

Related U.S. Application Data

[63] Continuation of Ser. No. 998,037, Dec. 29, 1992, abandoned.

[30] Foreign Application Priority Data

Jan. 6, 1992 [JP] Japan ................................ 4-000194
Feb. 25, 1992 [JP] Japan ................................ 4-038195

[51] Int. Cl.⁶ .................................................. G09G 5/28
[52] U.S. Cl. ........................ 345/138; 345/136; 382/256; 382/283; 395/141
[58] Field of Search ........................ 345/191, 185, 345/186, 199, 203, 115, 116, 131, 133, 136, 138; 382/256, 257, 266, 282, 283, 284; 395/141, 142

[56] References Cited

U.S. PATENT DOCUMENTS

| 5,042,074 | 8/1991 | Takeo et al. ................... 382/48 |
| 5,119,440 | 6/1992 | Duenyas et al. ................ 382/48 |
| 5,140,315 | 8/1992 | Edelson et al. ................ 340/703 |
| 5,168,529 | 12/1992 | Peregrim et al. .............. 382/48 |
| 5,181,261 | 1/1993 | Negao ........................... 382/48 |
| 5,319,551 | 6/1994 | Sekiguchi et al. ............. 382/256 |
| 5,390,291 | 2/1995 | Ohashi ......................... 395/119 |

Primary Examiner—Richard Hjerpe
Assistant Examiner—Lun-Yi Lao
Attorney, Agent, or Firm—Sughrue,Mion,Zinn,Macpeak & Seas, PLLC

[57] ABSTRACT

A read image is displayed and a specific point is set to a desired point to be subjected to an image processing. A first specific region is set within the range of a circle whose center is the specific point. A boundary of the first specific region is then expanded or contracted, thereby obtaining a boundary. A second specific region is set between the so-obtained boundary and the boundary of the first specific region. A predetermined image processing is effected on the first and second specific regions.

9 Claims, 13 Drawing Sheets

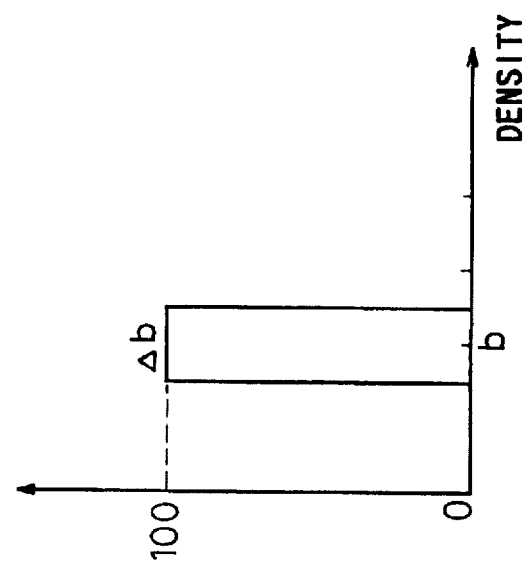
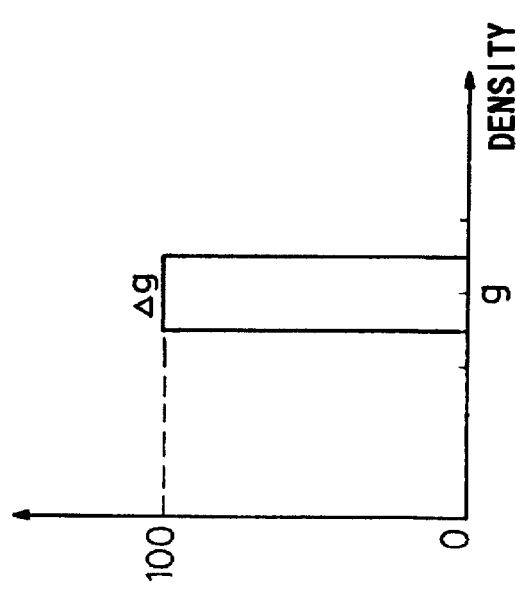
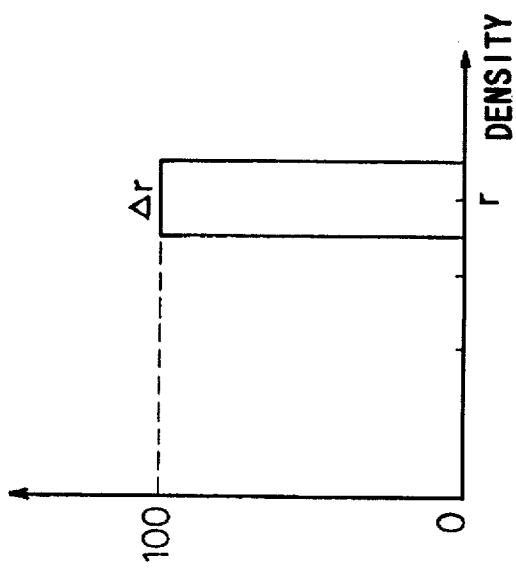

METHOD AND APPARATUS FOR PROCESSING IMAGE

This is a Continuation of application Ser. No. 07/998,037 filed Dec. 29, 1992, now abandoned.

BACKGROUND OF THE INVENTION

1. Field of the Invention

The present invention relates to a method and an apparatus for processing an image, wherein a specific region can be set onto an original image and a desired image processing can be effected on an image in the specific region.

2. Description of the Related Art

There have heretofore been proposed various methods such as a method of effecting an image processing including, for example, a gradation correction, contour emphasis, etc. on an original image which has been read by an image scanner, a video camera or the like so as to obtain a desired image, etc. When the image processing is uniformly applied without considering specific characteristic of image in various regions of the original image, there are resulted in a region on which a suitable processing has been effected and a region on which the suitable processing has not been effected.

Therefore, there has been proposed, for example, a method of specifying a processing region with respect to an original image which has been read by an image scanner or the like and displayed on a CRT by making use of a light pen or the like and effecting a desired image processing on the specified region.

The above method has, however, a problem in that when the desired image processing is effected on the specified processing region, the difference in level between images is produced at the boundary of the processing region.

SUMMARY OF THE INVENTION

It is therefore an object of the present invention to provide a method and an apparatus for processing an image, wherein when a desired image processing is effected on a specific region of an original image, an image which does not cause unnaturalness at the boundary of the specific region, can be obtained and when such an image processing is carried out, the work efficiency can be improved and the result of the image processing can be also confirmed immediately and easily.

According to a first aspect of the present invention, for achieving the above object, there is provided a method of effecting a desired image processing on a specific region of an original image, comprising the following steps: a first step for setting a first boundary onto the original image, a second step for shifting the first boundary either inwards or outwards so as to set a second boundary, and a third step for effecting a desired image processing on a first specific region surrounded by either the first boundary disposed inwardly and set prior to the shifting or the second boundary disposed inwardly to thereby produce a first processed image and for effecting an image processing for producing an image to be subjected to an intermediate image processing between the original image and the first processed image, on a second specific region formed between the first and second boundaries to thereby produce a second processed image.

The above method can further comprise a step of combining the original image with the first and second processed images.

According to the above method, the first boundary can be set as a boundary which surrounds an image region comprised of image data, which fall within a range of a given condition, of image data indicative of specific points specified on the original image.

The first and second specific regions and the region of the original image, which excludes the first and second specific regions, can be respectively set as mask image data for identifying the former corresponding regions and the later corresponding region.

The second boundary can be set by contracting or expanding the first boundary.

The second boundary can be set by effecting a smoothing process on mask image data lying in the vicinity of mask image data for identifying the region surrounded by the first boundary and a region other than the region and thereafter re-producing the mask image data using desired threshold values.

The smoothing process can be effected by a space filter process based on a convolution computation.

The second processed image can be obtained by adding together image data produced by processing the original image based on a gradation conversion characteristic whose gain is set to $\alpha$ times ($1 > \alpha > 0$) the gain of a gradation conversion characteristic used when the original image is obtained and image data produced by processing the original image based on a gradation conversion characteristic whose gain is set to $(1-\alpha)$ times the gain of a gradation conversion characteristic used when the first processed image is obtained.

The second processed image can also be obtained by adding together a first weighted image data produced by multiplying the original image data in the second specific region by a weighting coefficient $\beta$ ($1 > \beta > 0$) and a second weighted image data produced by multiplying the first processed image data in the second specific region by a weighting coefficient $(1-\beta)$.

According to a second aspect of the present invention, there is provided a method of effecting a desired image processing on a specific region of an original image, comprising the following steps: a first step for displaying the original image on image displaying means, setting first boundary onto the original image and displaying the same on the image displaying means, a second step for shifting the first boundary either inwardly or outwardly so as to set a second boundary and displaying the second boundary together with the original image and the first boundary, and a third step for effecting a desired image processing on a first specific region surrounded by either the first boundary disposed inwardly and set before the shifting or the second boundary disposed inwardly to thereby produce a first processed image, effecting an image processing for producing an image to be subjected to an intermediate image processing between the original image and the first processed image on a second specific region formed between the first and second boundaries to thereby produce a second processed image, combining the original image with the first and second processed images and displaying the combined image.

According to a third aspect of the present invention, there is provided an image processing apparatus for effecting a desired image processing on a specific region of an original image, comprising original image storing means for storing an original image therein, region setting means for setting a processing region onto the original image, condition setting means for setting a processing condition to the processing region, region storing means for storing the processing region therein, image processing means for effecting an image process on an image in the processing region based on the processing condition, processed image storing means for storing therein the processed image which has been subjected to the image process, and image displaying means for displaying the original image and the processed image thereon.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIGS. 5A through 5C are views illustrative of look-up tables for setting regions to be processed in accordance with the image processing method shown in FIG. 2;

DETAILED DESCRIPTION OF THE PREFERRED EMBODIMENTS

A method and an apparatus for processing an image, according to the present invention, will hereinafter be described in detail with reference to the accompanying drawings in which a preferred embodiment is shown by way of illustrative example.

Figure 1:
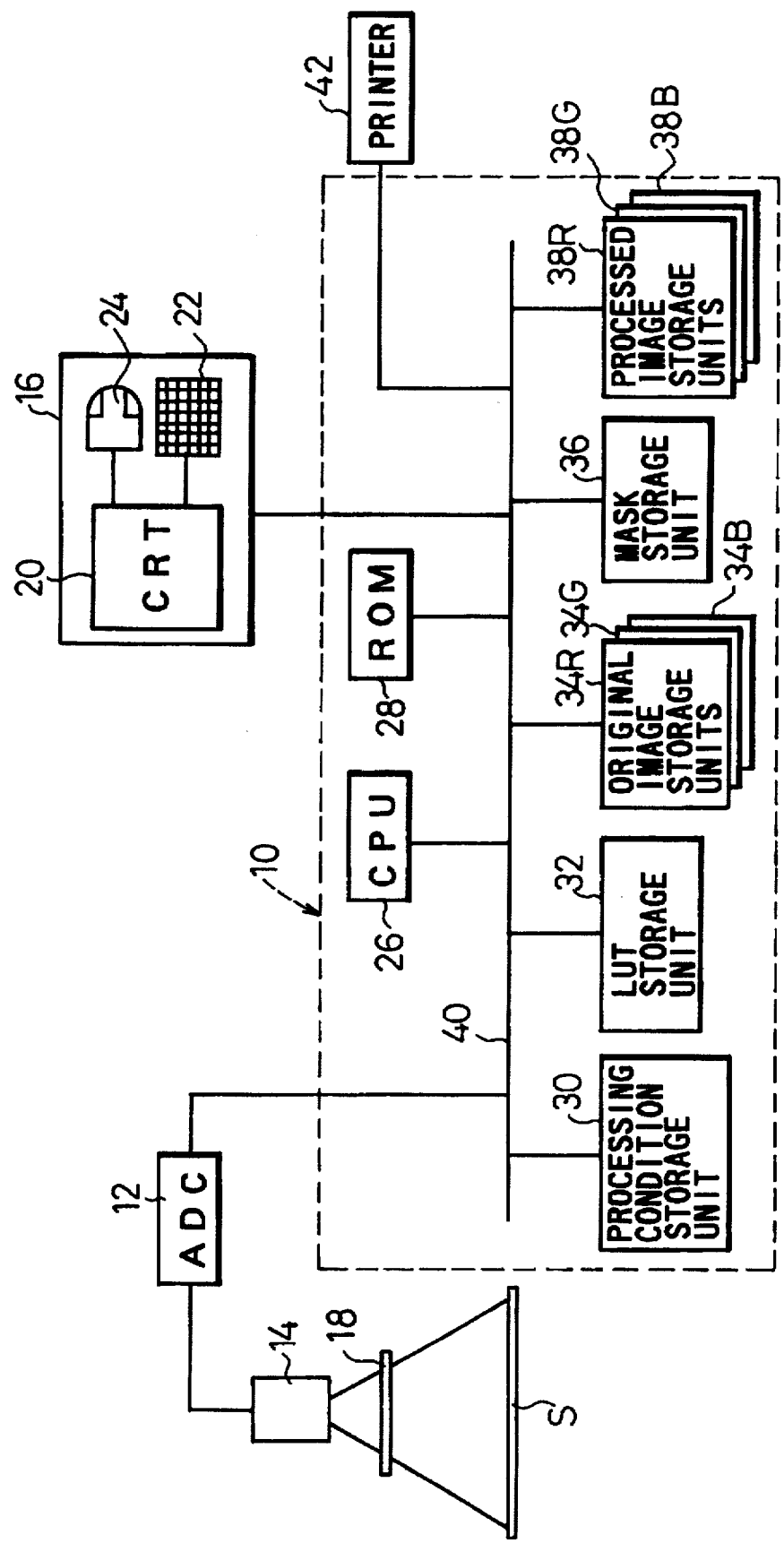
FIG. 1 is a block diagram showing an image processing apparatus according to the present invention.

FIG. 1 is a block diagram schematically showing the structure of an image processing apparatus to which an image processing method according to one embodiment of the present invention is applied.

Reference numeral 10 indicates an image processing apparatus. A CCD camera 14 is electrically connected to the image processing apparatus 10 through an A/D converter 12. Further, a console 16 is electrically connected to the image processing apparatus 10. The CCD camera 14 reads an initial or original image, which has been recorded on an original or subject S, by making use of a RGB switching filter 18 comprising R, G, B filters.

The console 16 includes a CRT display 20 (image displaying means), a keyboard 22 and a mouse 24 (region setting means and condition setting means). Further, the console 16 gives desired instructions to the image processing apparatus 10 based on an original image displayed on the CRT display 20 or a processed image to be described later.

The image processing apparatus 10 comprises a CPU 26 (image processing means), a ROM 28, a processing condition storage unit 30, an LUT (look-up table) storage unit 32, original image storage units 34R, 34G, 34B, a mask storage unit 36 (processed region storing means) and processed image storage units 38R, 38G, 38B, all of which are electrically connected to a bus 40. Incidentally, a printer 42 for outputting a processed image as a hard copy is electrically connected to the bus 40.

The CPU 26 effects the entire control of the image processing apparatus 10. The ROM 28 stores therein a program for specifying a processing procedure executed by the CPU 26. The processing condition storage unit 30 stores therein a condition for processing the original image, which has been set by either the keyboard 22 or the mouse 24. The LUT storage unit 32 stores therein as data, a look-up table for processing the original image based on the stored processing condition or producing mask image data to be described later. The original image storage units 34R, 34G, 34B store therein original images of colors R, G, B, which have been separated by the RGB switching filter 18 and read by the CCD camera 14. The mask storage unit 36 stores specific regions set to effect a desired image processing on the original image, as mask image data therein. The processed image storage units 38R, 38G, 38B store therein images obtained by effecting the desired image processing on the specific regions of the original image.

The image processing apparatus 10 according to the present embodiment is basically constructed as described above. A method of processing an image using the image processing apparatus 10 will now be described below.

Figure 2:
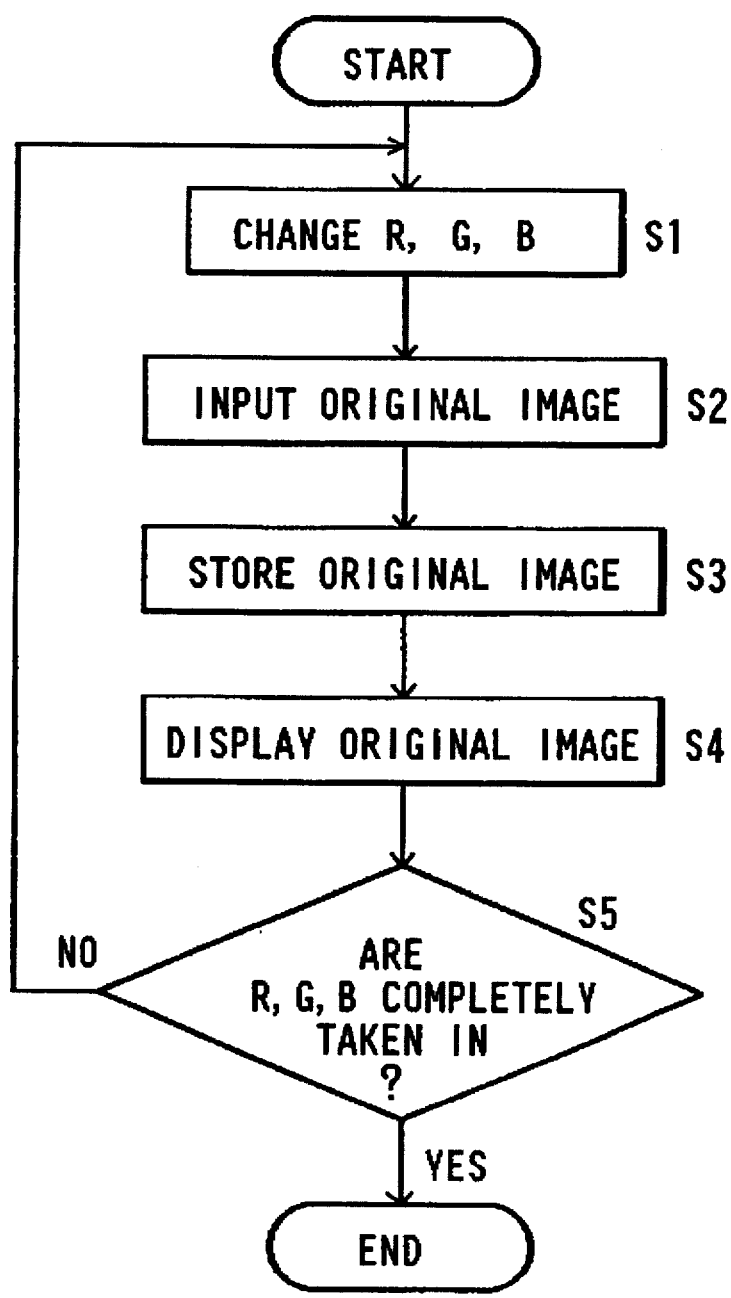
FIG. 2 is a flowchart for describing an original image reading process which is executed based on an image processing method according to the present invention.

A description will first be made of a process for reading an original image based on a flowchart shown in FIG. 2.

The CCD camera 14 reads an original image recorded on an original S in a state in which the RGB switching filter 18 has been set to the R filter for mainly extracting red data (Steps S1 and S2). The read image is then converted into a digital signal by the A/D converter 12, which is thereafter electrically-processed under a desired look-up table. The processed signal is stored as data in the original image storage unit 34R through the bus 40 and displayed on the CRT display 20 of the console 16 (Steps S3 and S4). The processing procedures executed in Steps S2 through S4 are then repeated in a state in which the RGB switching filter 18 has been set to the G filter for mainly extracting green data and the B filter for mainly extracting blue data. Thereafter, respective original images obtained in accordance with the processing procedures referred to above are stored in the corresponding original image storage units 34G, 34B (Step S5).

Figure 3:
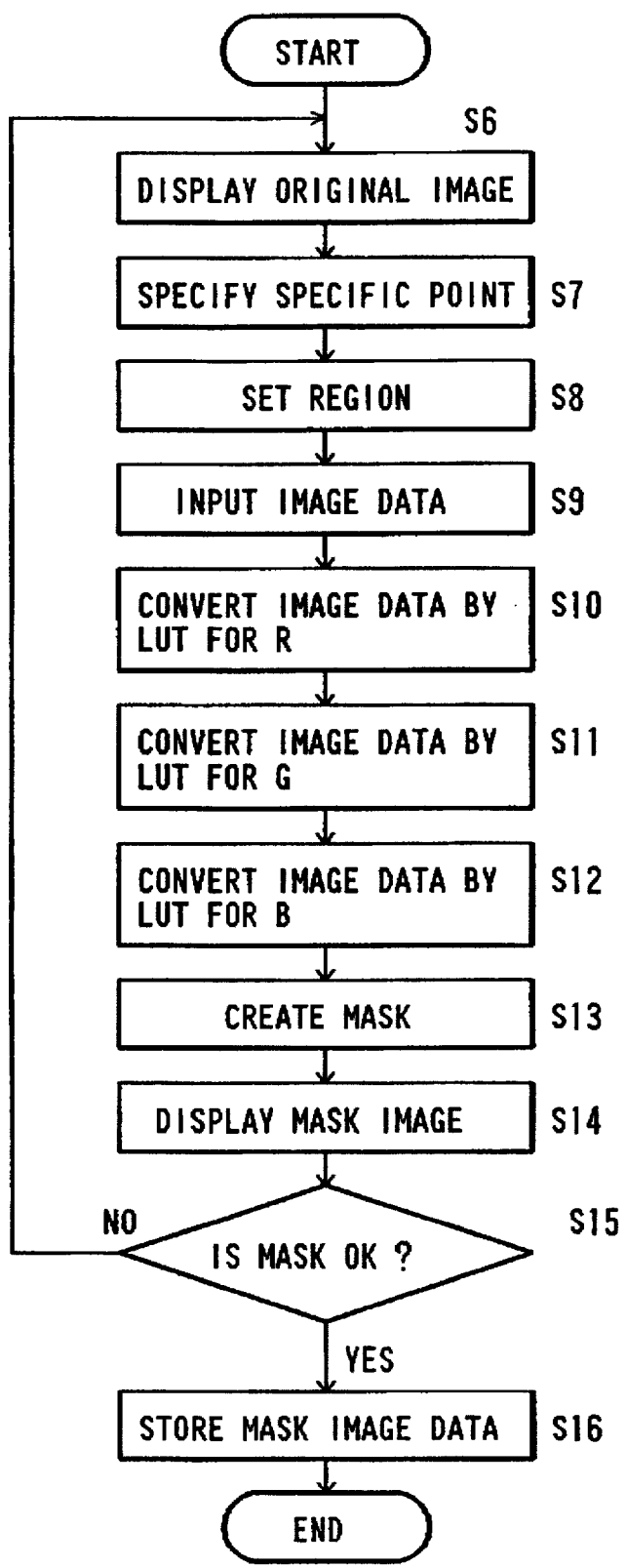
FIG. 3 is a flowchart for describing a mask producing process executed based on the image processing method according shown in FIG. 2.

A description will next be made of a case in which a specific region is set onto an original image, based on a flowchart shown in FIG. 3.

Figure 4:
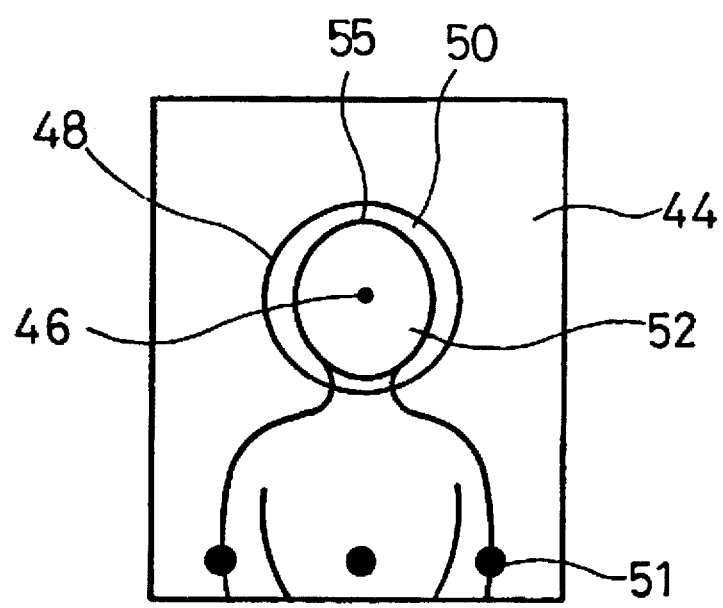
FIG. 4 is a view illustrative of a specific region set based on the image processing method shown in FIG. 2.

As shown in FIG. 4, an original image 44 is first displayed on the CRT display 20 (Step S6). Further, a point where the original image 44 is subjected to a desired image processing by using the mouse 44, for example, a specific point 46 is specified on a face (Step S7). Next, the diameter of a circle 48 in which the specific point 46 is defined as the center, is adjusted by using the mouse 24 to thereby set a region 50 surrounded by the circle 48 (Step S8). The region 50 can be freely adjusted by the mouse 24.

A description will next be made of a case where a first specific region 52 to be subjected to a desired image processing is set within the region 50.

The CPU 26 first reads image data r, g, b indicative of the original image 44 corresponding to the position of the specific point 46 from the corresponding original image storage units 34R, 34G, 34B every colors (Step S9). Then, look-up tables (see FIGS. 5A through 5C) for extracting image data whose density falls within ranges of r±Δr/2, g±Δg/2, b±Δb/2, based on these image data r, g, b and predetermined density widths Δr, Δg, Δb, are created. In these look-up tables, the density which falls within the ranges of r±Δr/2, g±Δg/2 and b±Δb/2, for example, is set so as to correspond to 100, and density which falls beyond these ranges, is set so as to correspond to 0. Mask image data are produced every colors of R, G, B by converting or transforming the image data indicative of the original image 44 in the region 50, using these look-up tables (Steps S10 through S12). In the mask image data of R, for example, the image data thereof in the region 50, having the density of r±Δr/2, are set as 100 and the remaining image data are set as 0.

Figure 6:
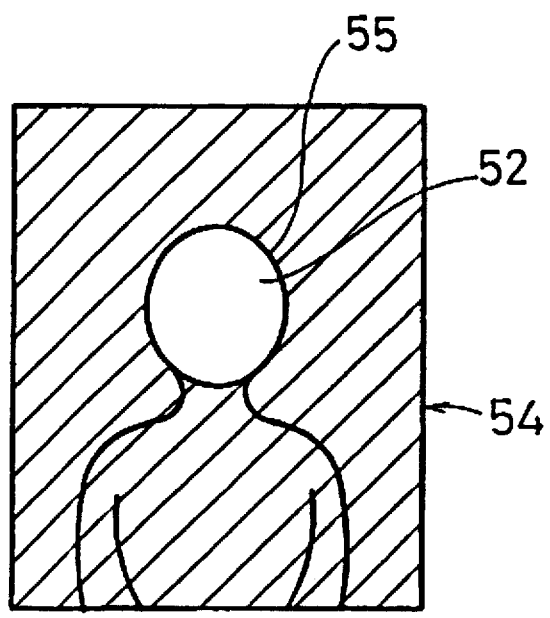
FIG. 6 is a view for describing a common mask set based on the image processing method shown in FIG. 2.

Next, a first mask 54 (see FIG. 6) for specifying the first specific region 52 which exists within the region 50 of the original image 44 and falls within the ranges of predetermined density widths Δr/2, Δg/2, Δb/2, is created by determining portions or data common to the mask image data of the colors R, G, B, which have been produced in the above-described manner (Step S13). Incidentally, the first mask 54 is displayed on the CRT display 20 (Step S14). If it is determined by an operator that the first mask 54 shown in FIG. 6 is a desired one (Step S15), then corresponding mask image data are stored in the mask storage unit 36 as they are (Step S16). If not so, then the processes which are executed in Steps S10 through S16, are repeatedly carried out, thereby making it possible to create a desired first mask 54.

A portion corresponding to a human face having a substantially identical or uniform hue as shown in FIG. 4, for example, can be automatically set as a region surrounded by a first boundary 55 by specifying the first specific region 52 based on the first mask 54 which has been obtained in the above-described manner.

Figure 7:
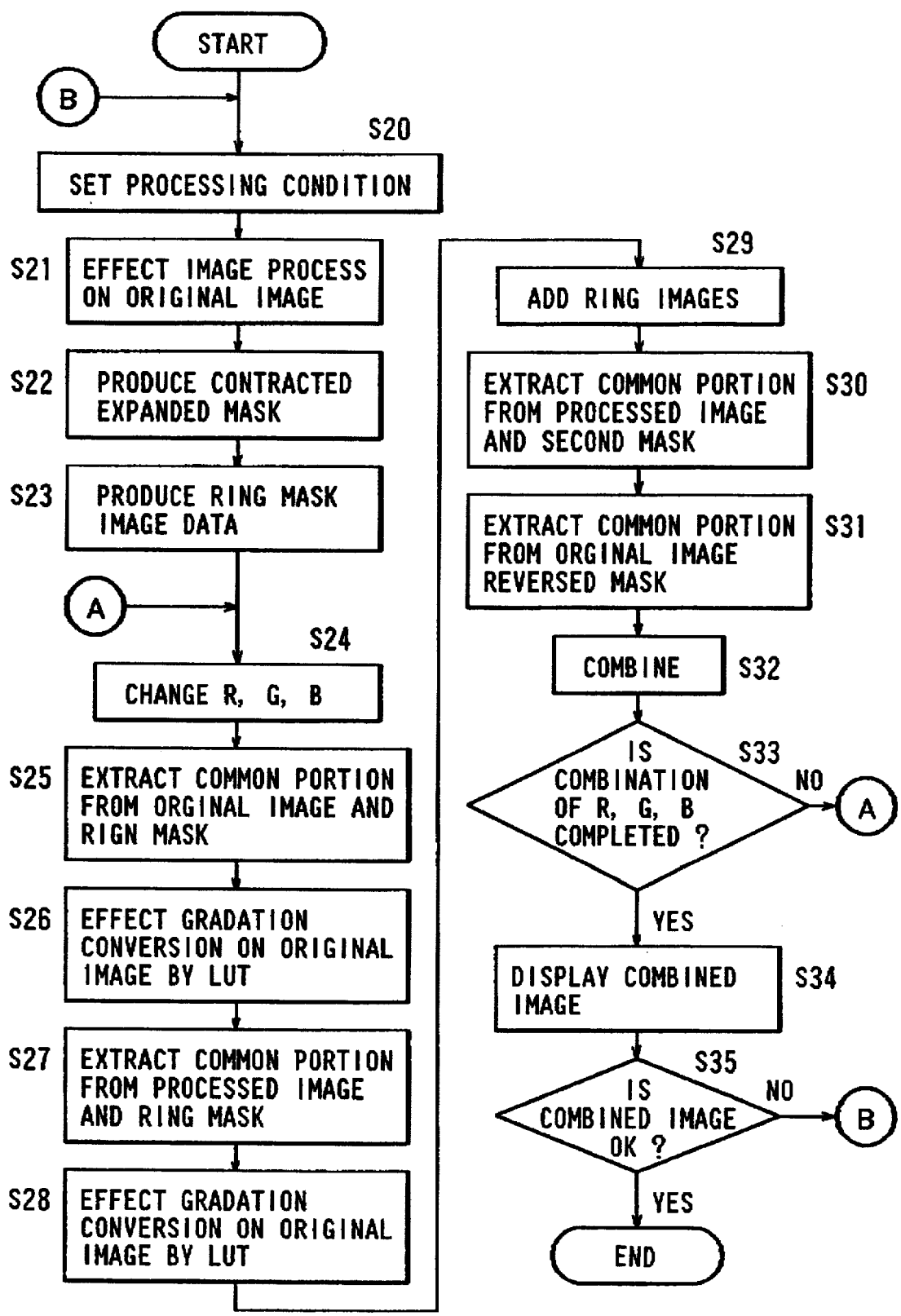
FIG. 7 is a flowchart for describing an image processing executed based on the image processing method shown in FIG. 2.

A description will next be made of a case where the original image 44 (see FIG. 4) in the first specific region 52 is subjected to a desired image processing, in accordance with a flowchart shown in FIG. 7.

First of all, the operator sets a processing condition using the mouse 24 or the keyboard 22 (Step S20). In this case, the original image 44 and the first specific region 52 have been already displayed on the CRT display 20 as illustrated in FIG. 4. Further, a plurality of processing condition setting marks 51 have been already displayed on the CRT display 20. Incidentally, the processing condition setting marks 51 are taken as being corresponding to a processing condition that the original image 44 in the first specific region 52 is "brightened" or "darkened" as compared with the image which has been displayed at present, for example.

When the operator selects a processing condition setting mark 51 corresponding to a desired processing condition using the mouse 24, the CPU 26 of the image processing apparatus 10 selects a look-up table corresponding to the processing condition from the LUT storage unit 32 and processes, for conversion or transformation of gradation, original images 44 having respective colors, which have been stored in the corresponding original image storage units 34R, 34G, 34B, using the selected look-up table. Thereafter, the so-processed images are stored in the corresponding processed image storage units 38R, 38G, 38B as first processed images (Step S21).

Figure 8:
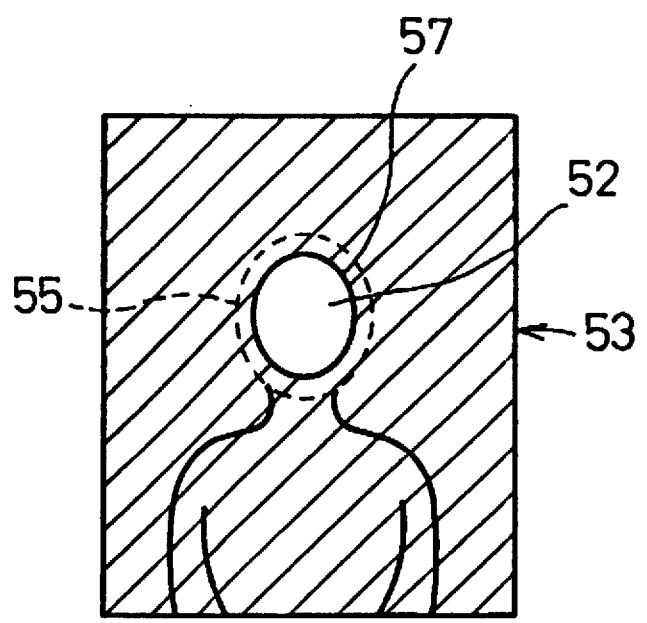
FIG. 8 is a view for describing another common mask set based on the image processing method shown in FIG. 2.
Figure 9C:
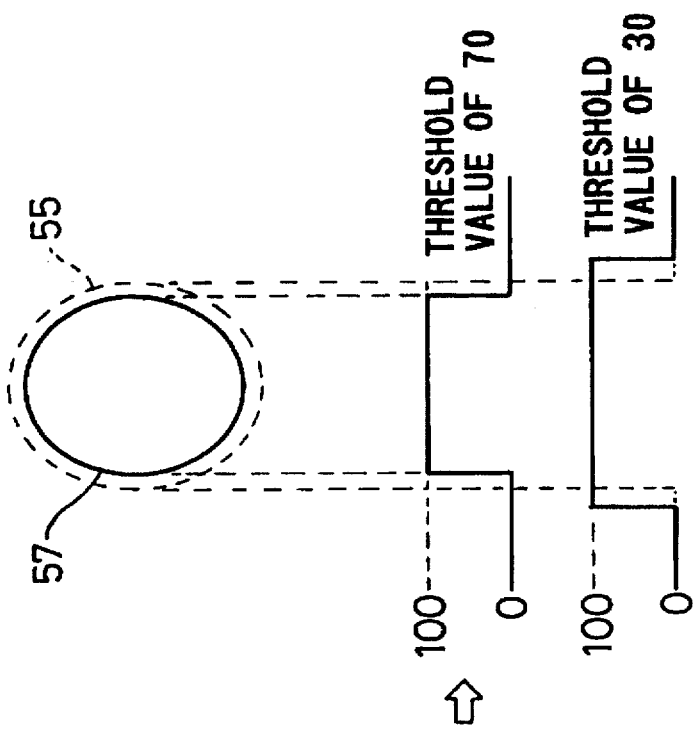
FIGS. 9A through 9C are views for describing a expanding and contracting process executed in accordance with the image processing method shown in FIG. 2.
Figure 9B:
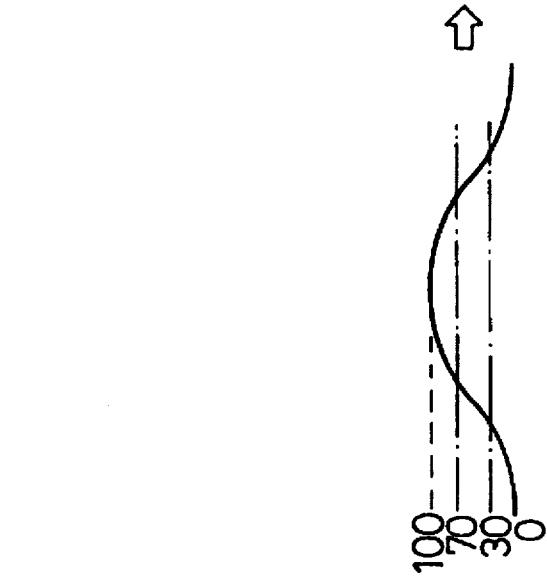
Figure 9A:
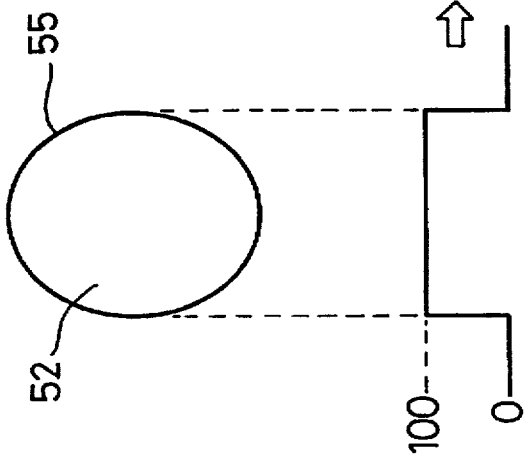

Next, the CPU 26 reads the mask image data corresponding to the first mask 54 (see FIG. 6), which have been stored in the mask storage unit 36, and expands or contracts regions for the read mask image data, thereby forming a second mask 53 as shown in FIG. 8 (Step S22). FIG. 8 shows the manner in which a second boundary 57 of the second mask 53 is produced or created by contracting the first boundary 55 of the first mask 54. FIGS. 9A through 9C show a method of producing the second boundary 57.

A description will now be made of a method of processing a desired region for expansion and contraction. In the first mask 54 shown in FIG. 6, for example, which is shaped in the form of an ellipse, the mask image data of the first specific region 52 are defined as 100 and the mask image data other than the mask image data of the first specific region 52 are defined as 0 (see FIG. 9A). Mask image data which exist in the vicinity of the first boundary 55, are smoothed under space filter processing based on convolution computations. When a matrix such as the following expression (1), which is good in symmetry, is used as a space filter, data having characteristics shown in FIG. 9B are obtained.

$$\begin{vmatrix} 1/8 & 1/8 & 1/8 \\ 1/8 & 0 & 1/8 \\ 1/8 & 1/8 & 1/8 \end{vmatrix} \text{ or } \begin{vmatrix} 0 & 1/4 & 0 \\ 1/4 & 0 & 1/4 \\ 0 & 1/4 & 0 \end{vmatrix} \quad (1)$$

Next, a threshold value of 50 or above, e.g., a threshold value of 70 is set to the obtained data. Further, a threshold value less than or equal to the threshold value of 70 is defined as 0 and a threshold value more than or equal to the threshold value of 70 is defined as 100. Thus, data having characteristics shown in an upper position as seen in FIG. 9C are obtained under this condition. As a result, the first specific region 52 surrounded by the contracted second boundary 57 is set. In order to obtain an expanded boundary, a threshold value of 50 or less may be set to data shown in FIG. 9B. Data having characteristics shown in a lower position as seen in FIG. 9C are produced when the threshold value is set to 30. This shows a boundary expanding and contracting method using the space filter process. However, there is also known a method of simply shifting a boundary in an X or Y direction in an X-Y conversion system.

Figure 10:
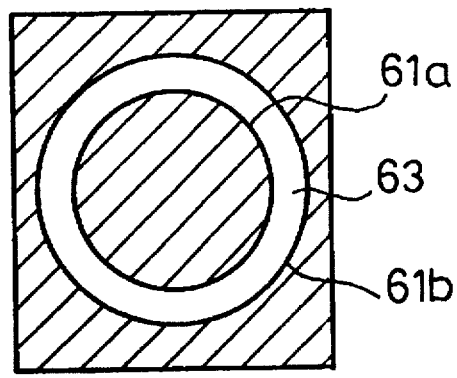
FIG. 10 is a view for describing a mask subjected to the expanding and contracting process shown in FIGS. 9A through 9C.
Figure 11:
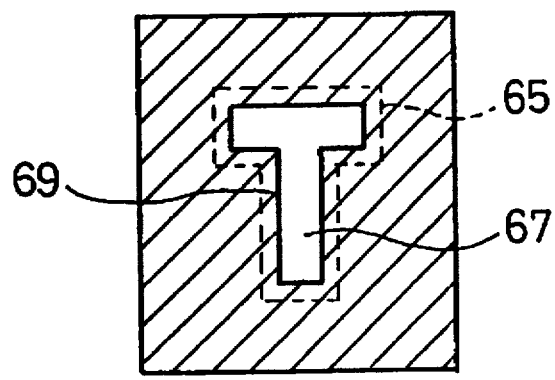
FIG. 11 is a view for describing another mask subjected to the expanding and contracting process shown in FIGS. 9A through 9C.
Figure 12:
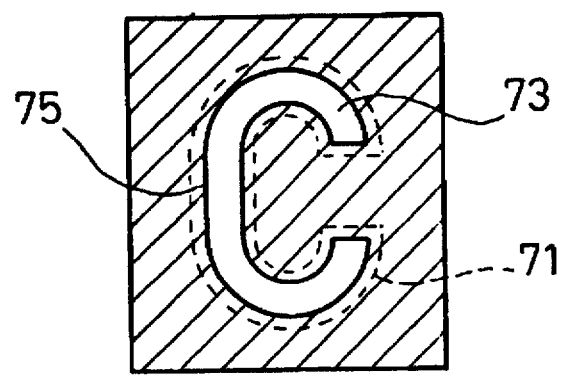
FIG. 12 is a view for describing a further mask subjected to the expanding and contracting process shown in FIGS. 9A through 9C.

By effecting the above process, an isotropically expanded or contracted boundary different from the initially set boundary can be obtained. Let's now consider a region 63 surrounded by boundaries 61a, 61b of two concentric circles shown in FIG. 10, for example. In this case, the position of the central line between the boundaries 61a and 61b varies with the expansion and contraction of the boundaries when the boundaries are simply set in accordance with a normal boundary expanding and contracting process. If, however, the boundaries 61a, 61b are expanded and contracted respectively by using the above process, then the region 63 can be isotropically expanded while the position of the central line therebetween is kept unchanged as it is. Let's also consider a region surrounded by a boundary 65 shown in FIG. 11. In this case, a region 67 surrounded by a boundary 69 which has been isotropically contracted based on the above contracting process can be obtained without displacing the corresponding central line. Let's further consider a region surrounded by a boundary 71 shown in FIG. 12. In this case, a region 73 surrounded by a boundary 75 which has been isotropically contracted based on the above contracting process, can be created with out displacing the corresponding central line.

Figure 13:
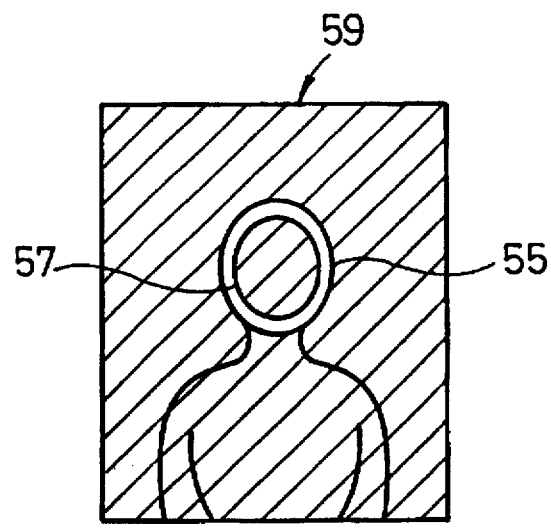
FIG. 13 is a view for describing a ring mask set based on the image processing method shown in FIG. 2.

Next, the difference between the mask image data corresponding to the first mask 54 (see FIG. 6) which has been produced based on the above expansion and contraction process and the mask image data corresponding to the second mask (see FIG. 8) is determined, thereby producing mask image data corresponding to a ring mask 59 shown in FIG. 13. Thereafter, the so-produced mask image data are stored in the mask storage unit 36 (Step S23).

Figure 14:
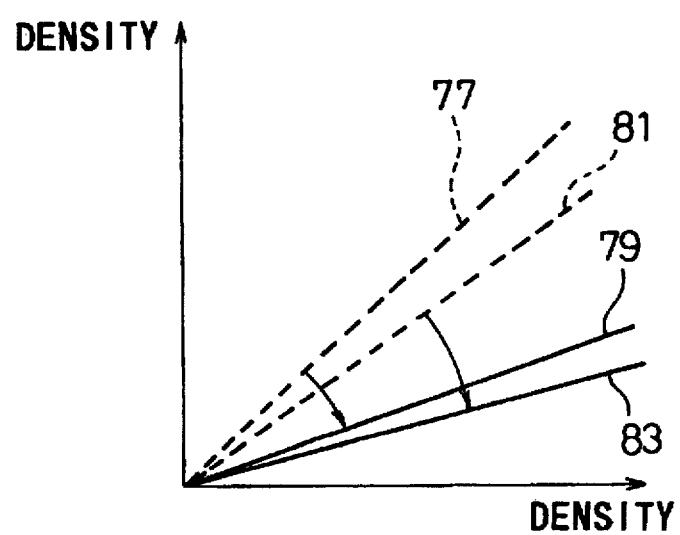
FIG. 14 is a view for describing a look-up table employed in the image processing method shown in FIG. 2.

Then, the colors of R, G, B are successively switched (Step S24). Thereafter, a common portion between the original image 44 and the ring mask 59 is extracted for each color (Step 825). Incidentally, the common portion can be obtained by performing an AND operation on the image data about the original image 44 and the mask image data about the ring mask 59. Next, the original image 44 corresponding to the common portion is processed for the conversion or transformation of gradation as illustrated in FIG. 14 using a look-up table 79 whose gain has been set to half the gain of a look-up table 77 used upon creation of the original image 44 shown in FIG. 4 (Step S26).

Similarly, a common portion between the first processed image obtained based on the processing condition which has been set in Step S21 and the above ring mask 59 is extracted (Step S27). As illustrated in FIG. 14, the first processed image corresponding to the common portion is processed for the transformation of gradation by making use of a look-up table 83 whose gain has been set to half the gain of a look-up table 81 used when the first processed image is produced in Step S21 (Step S28).

Then, the images obtained by the gradation transformation in the above-described manner are added together to thereby obtain a ring image corresponding to a second processed image which has been subjected to the weighted average according to the ring mask 59 (Step S29).

Incidentally, in the embodiment described above, the original image is processed based respectively on a gradation conversion characteristic whose gain is set to half the gain of a gradation conversion characteristic used when the original image is obtained, and on a gradation conversion characteristic whose gain is set to half the gain of a gradation conversion characteristic used when the first processed image is obtained. However, the original image can also be processed based respectively on a gradation conversion characteristic whose gain is set to $\alpha$ times ($1>\alpha>0$) the gain of a gradation conversion characteristic used when the original image is obtained, and on a gradation conversion characteristic whose gain is set to ($1-\alpha$) times the gain of a gradation conversion characteristic used when the first processed image is obtained.

Figure 15:
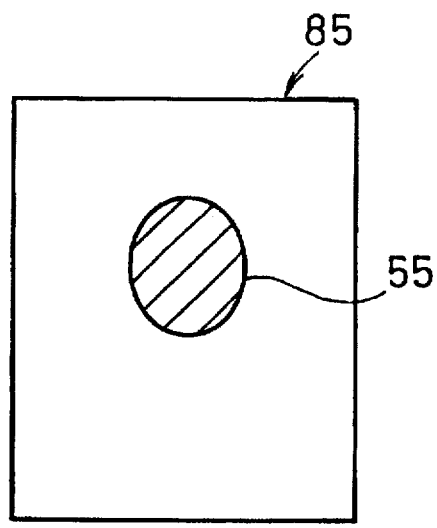
FIG. 15 is a view for describing a reversed mask set based on the image processing method shown in FIG. 2.
Figure 16:
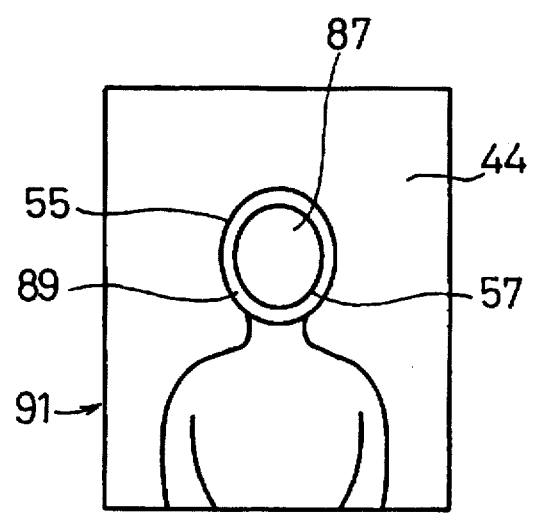
FIG. 16 is a view illustrative of an image combined in accordance with the image processing method shown in FIG. 2.

Next, a common portion between the first processed image obtained in Step S21 and the second mask 53 is extracted (Step S30). Further, a common portion between the original image 44 and a reversed mask 85 (see FIG. 15) obtained by inverting the first mask 54 is extracted (Step S31). Thereafter, the ring image which has been obtained in Step S29, is combined with the common portions which have been obtained in Steps S30 and S31 (Step S32). Incidentally, this combination can be effected by an OR operation. The above processing is performed for each color of R, G, B (Step S33). Further, the combining processing is effected in the same manner as described above. Thus, a combined image 91 comprising a processed image 87 formed as a portion surrounded by a second boundary 57, an image 89 obtained by subjecting the processed image 87 and the original image 44 to the weighted average, which is formed as a portion between the first and second boundaries 55 and 57, and the original image 44 formed as a portion located outwardly from the first boundary 55, can be obtained as shown in FIG. 16. The combined image 91 is displayed on the CRT display 20 (Step S34). When a desired combined image 91 is not obtained, the processing procedures executed in Steps S20 through S34 are repeated again so that the desired combined image 91 can be created (Step S35).

Incidentally, the above embodiment shows the case where the weighted and averaged image (the second processed image) 89 corresponding to the ring mask 59 is obtained by using the look-up table shown in FIG. 14. However the combined image 91 including the weighted and averaged image 89 can also be obtained by setting the weighting coefficient corresponding to the second mask 53 (see FIG. 8), the ring mask 59 (see FIG. 13) and the reversed mask 85 (see FIG. 15) and processing as follows.

Namely, the first weighted image is obtained by setting the weighting coefficient 0 in the first specific region of the second mask 53, the weighting coefficient $\beta$ ($1>\beta>0$) in the second specific region of the ring mask 59 and the weighting coefficient 1 in the specific region of the reversed mask 85, and multiplying respective corresponding picture elements in the original image by the weighting coefficients of 0, $\beta$ and 1. Similarly, the second weighted image is obtained by setting the weighting coefficient 1 in the first specific region of the second mask 53, the weighting coefficient 1-$\beta$ in the second specific region of the ring mask 59 and the weighting coefficient 0 in the specific region of the reversed mask 85, and multiplying respective corresponding picture elements in the first processed image obtained by S21 by the weighting coefficients of 1, 1-$\beta$ and 0. Thus, the combined image 91 whose first specific region is the first processed image and the second specific region is the weighted and averaged image (the second processed image) is obtained by adding the first and second weighted images. Here, if an averaging process is effected upon setting weighting coefficients, an effective result is obtained in which the weighting coefficients vary continuously.

Further, the above embodiment shows the case where the region for effecting an intermediate image processing is defined as one. This region may however be provided in multiple form. In this case, a further satisfactory image which is not different in level from its associated image, i.e., unobtrusive as compared with its associated image, can be obtained by successively subjecting the multiple regions to the intermediate image processing while the luminances of the regions are being varied.

In the above embodiment as well, the image corresponding to the ring mask 59 is used as the image 89 which has been subjected to the weighted average. However, the following process may be effected as an alternative to the weighted average process. That is, the portions corresponding to the first and second masks 54, 53 are first subjected to a predetermined image processing and the portion corresponding to the first mask 54 is then subjected to the predetermined image processing again, thereby making it possible to bring about the same effect as described above.

Further, in the above embodiment, the first boundary formed in the original image is isotropically expanded and contracted so as to form the second boundary, thereby setting the second specific region. However, the first boundary may be anisotropically expanded and contracted.

Figure 17:
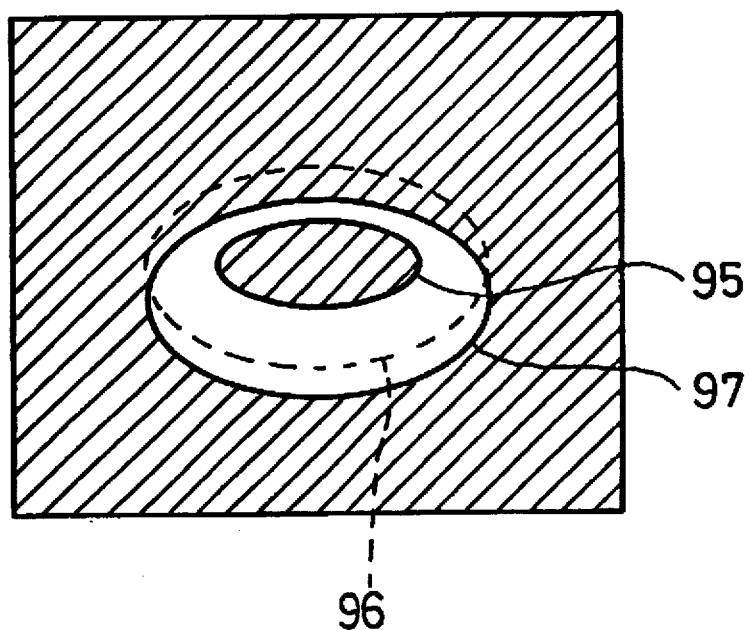
FIG. 17 is a view for describing a mask produced by shifting a boundary obtained in accordance with the expanding and contracting process shown in FIGS. 9A through 9C.

As a method of specifically effecting such an anisotropic process, there is considered, for example, a method of anisotropically setting the matrix of the equation (1), which serves as the space filter, to a matrix represented by an expression (2), or a method of isotropically expanding (or contracting) a first boundary 95 as shown in FIG. 17 to thereby form a boundary 96 and graphically displacing the boundary 96 only a suitable distance in one direction to thereby obtain a second boundary 97. A desired specific region can be obtained in this way.

$$\begin{vmatrix} 0 & 1/8 & 0 \\ 1/8 & 1/8 & 1/8 \\ 1/8 & 2/8 & 1/8 \end{vmatrix} \quad (2)$$

The method and the apparatus for processing the image, according to the present invention, as has been described above, can bring about the following advantageous effects.

Described specifically, a specific region is first set to an original image and then subjected to a desired image processing. Further, a boundary of the specific region is subjected to an image processing for producing an image to be subjected to an intermediate image processing between a processed image and the original image. As a result, a processed image which does not cause a level difference in the boundary of the specified region, can be obtained.

Further, a desired boundary can be obtained by expanding or contracting the specific region upon setting of the boundary, thereby making it possible to create a desired processed image.

Furthermore, the work efficiency can be improved by displaying the above processing procedure on an image displaying means and effecting the same. It is also possible to immediately and easily confirm the result of the image processing.

Having now fully described the invention, it will be apparent to those skilled in the art that many changes and modifications can be made without departing from the spirit or scope of the invention as set forth herein.

What is claimed is:

1. A method of effecting desired image processes on specific regions of an original image, comprising the steps of:

a first step of setting specific points in said original image, at which the desired image processes are to be effected;

a second step of setting a first boundary which surrounds an image region comprised of image data which satisfy a given condition with respect to image data at the specific points in said original image;

a third step of effecting a first image process on a first specific region surrounded by said first boundary to thereby produce a first processed image;

a fourth step of shifting said first boundary either inwardly or outwardly so as to set a second boundary; and a fifth step of effecting a second image process on a second specific region formed between said first and second boundaries to thereby produce a second processed image which is an intermediate image between said original image and said first processed image.

2. A method according to claim 1, further comprising a step of combining said original image with said first and second processed images.

3. A method according to claim 1, wherein said first and second specific regions are respectively set in the form of mask image data, in said mask image data corresponding to said first specific region, a region of said original image other than said first specific region being masked, in said mask image data corresponding to said second specific region, a region of said original image other than said second specific region being masked, respectively.

4. A method according to claim 1, wherein said second boundary is set by contracting or expanding said first boundary.

5. A method according to claim 3, wherein said second boundary is set by effecting a smoothing process on the mask image data lying in the vicinity of said first boundary and thereafter re-producing said mask image data using desired threshold values.

6. A method according to claim 5, wherein said smoothing process is a space filter process based on a convolution computation.

7. A method according to claim 1, wherein said second processed image is obtained by adding together image data produced by processing said original image based on a gradation conversion characteristic whose gain is set to α times (1>α>0) the gain of a gradation conversion characteristic used when said original image is obtained and image data produced by processing said original image based on a gradation conversion characteristic whose gain is set to (1−α) times the gain of a gradation conversion characteristic used when said first processed image is obtained.

8. A method according to claim 1, wherein said second processed image is produced by adding together a first weighted image data produced by multiplying said original image in the second specific region by a weighting coefficient β (1>β>0) and a second weighted image data produced by multiplying said first processed image data in the second specific region by a weighting coefficient (1−β).

9. A method of effecting desired image processes on specific regions of an original image, comprising the steps of:

a first step of displaying specific points set in said original image at which the desired image processes are to be effected;

a second step of displaying a first boundary which surrounds an image region comprised of image data which satisfy a given condition with respect to image data at the specific points in said original image;

a third step of shifting said first boundary either inwardly or outwardly so as to set a second boundary and displaying said second boundary together with said original image;

a fourth step of effecting a second image process on a second specific region formed between said first and second boundaries to thereby produce a second processed image which is an intermediate image between said original image and said first processed image; and a fifth step of combining said original image with said first and second processing images and displaying the combined image.

* * * * *